US012476941B2

(12) United States Patent
Bhagra et al.

(10) Patent No.: US 12,476,941 B2
(45) Date of Patent: Nov. 18, 2025

(54) LOAD BALANCING SECURE NETWORK TRAFFIC

(71) Applicant: Palo Alto Networks, Inc., Santa Clara, CA (US)

(72) Inventors: Pankaj Bhagra, Fremont, CA (US); Aniket Ghule, San Jose, CA (US); Srinivasan Komandoor Santhanam, Sunnyvale, CA (US); Arivu Mani Ramasamy, San Jose, CA (US); Prashant Murlidhar Dave, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 121 days.

(21) Appl. No.: 18/227,159

(22) Filed: Jul. 27, 2023

(65) Prior Publication Data

US 2025/0039151 A1 Jan. 30, 2025

(51) Int. Cl.
*H04L 9/40* (2022.01)
*H04L 12/46* (2006.01)
(Continued)

(52) U.S. Cl.
CPC ........ *H04L 63/029* (2013.01); *H04L 12/4633* (2013.01); *H04L 43/0882* (2013.01);
(Continued)

(58) Field of Classification Search
CPC .............. H04L 63/029; H04L 12/4633; H04L 43/0882; H04L 47/125; H04L 61/2546;
(Continued)

(56) References Cited

U.S. PATENT DOCUMENTS

| 2007/0223377 A1* | 9/2007 | de Heer | H04L 67/1012 370/235 |
| 2010/0036951 A1* | 2/2010 | Kamath | H04L 67/1029 709/225 |

(Continued)

FOREIGN PATENT DOCUMENTS

WO 2024012065 1/2024

OTHER PUBLICATIONS

Afanasyev, et al. "BGP routing table: Trends and Challenges." ResearchGate Jan. 2010, accessed at https://www.researchgate.net/publication/228865348.
Begum et al. "Review of load balancing in cloud computing." International Journal of Computer Science Issues (IJCSI), vol. 10, Issue 1, (2013).
Kaur et al. "A review of load balancing strategies for distributed systems." International Journal of Computer Applications, vol. 121, No. 18, (2015).

(Continued)

*Primary Examiner* — Anh Nguyen
(74) *Attorney, Agent, or Firm* — Van Pelt, Yi & James LLP

(57) ABSTRACT

Techniques for load balancing secure network traffic are disclosed. A system, process, and/or computer program product for load balancing secure network traffic includes monitoring network traffic for one branch of a plurality of branches for an enterprise network, and splitting the network traffic of the one branch into a plurality of network segments based on a determination that the network traffic exceeds traffic capacity of at least one security processing node (SPN) of a plurality of SPNs using a network load balancer (NLB) in communication with a plurality of Network Processing Nodes (NPNs), the plurality of monitored branches being distributed to the plurality of SPNs via a plurality of tunnels.

13 Claims, 9 Drawing Sheets

(51) Int. Cl.
*H04L 43/0882* (2022.01)
*H04L 47/125* (2022.01)
*H04L 61/2546* (2022.01)

(52) U.S. Cl.
CPC ........ *H04L 47/125* (2013.01); *H04L 61/2546* (2013.01); *H04L 63/1425* (2013.01)

(58) Field of Classification Search
CPC ............. H04L 63/1425; H04L 61/2514; H04L 61/2517
See application file for complete search history.

(56) References Cited

U.S. PATENT DOCUMENTS

| | | | | |
|---|---|---|---|---|
| 2021/0243248 | A1* | 8/2021 | Pollitt | H04L 61/2592 |
| 2021/0306393 | A1* | 9/2021 | Muniyappa | H04L 45/38 |
| 2023/0034229 | A1* | 2/2023 | Oliveira | H04L 43/045 |
| 2025/0007835 | A1* | 1/2025 | Chhabra | H04L 63/1408 |

OTHER PUBLICATIONS

Patel et al. "Ananta: Cloud scale load balancing." ACM SIGCOMM Computer Communication Review 43.4 (2013): 207-218.
Yang et al. "Guarantee IP lookup performance with FIB explosion." Proceedings of the 2014 ACM Conference on SIGCOMM. 2014.
Anonymous, Prisma Access for Networks Aggregate Bandwidth Licensing, XP093200631, Jun. 10, 2023, pp. 1-2, https://web.archive.org/web/20230610175356/https://docs.paloaltonetworks.com/prisma/prisma-sd-wan/deployment-and-integrations/2"1-1/prisma-access-cloudblade-integration-guide/prisma-access-for-networks-aggragate-bandwidth-licensing.
Wikipedia, Subnetwork, Jul. 12, 2022, pp. 1-9, https://web;archive.org/web/20220712044820/https://en.wikipedia.org/wiki/Subnetwork#Subnetting.

* cited by examiner

LOAD BALANCING SECURE NETWORK TRAFFIC

BACKGROUND OF THE INVENTION

Malicious software (malware) generally refers to unwanted, hostile, or intrusive software that can be used to disrupt computer or network operations, collect private or sensitive information, or access private computer systems or networks. Malware can be in the form of executable code, scripts, active content, and other software. Example malware includes computer viruses, worms, Trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1A:
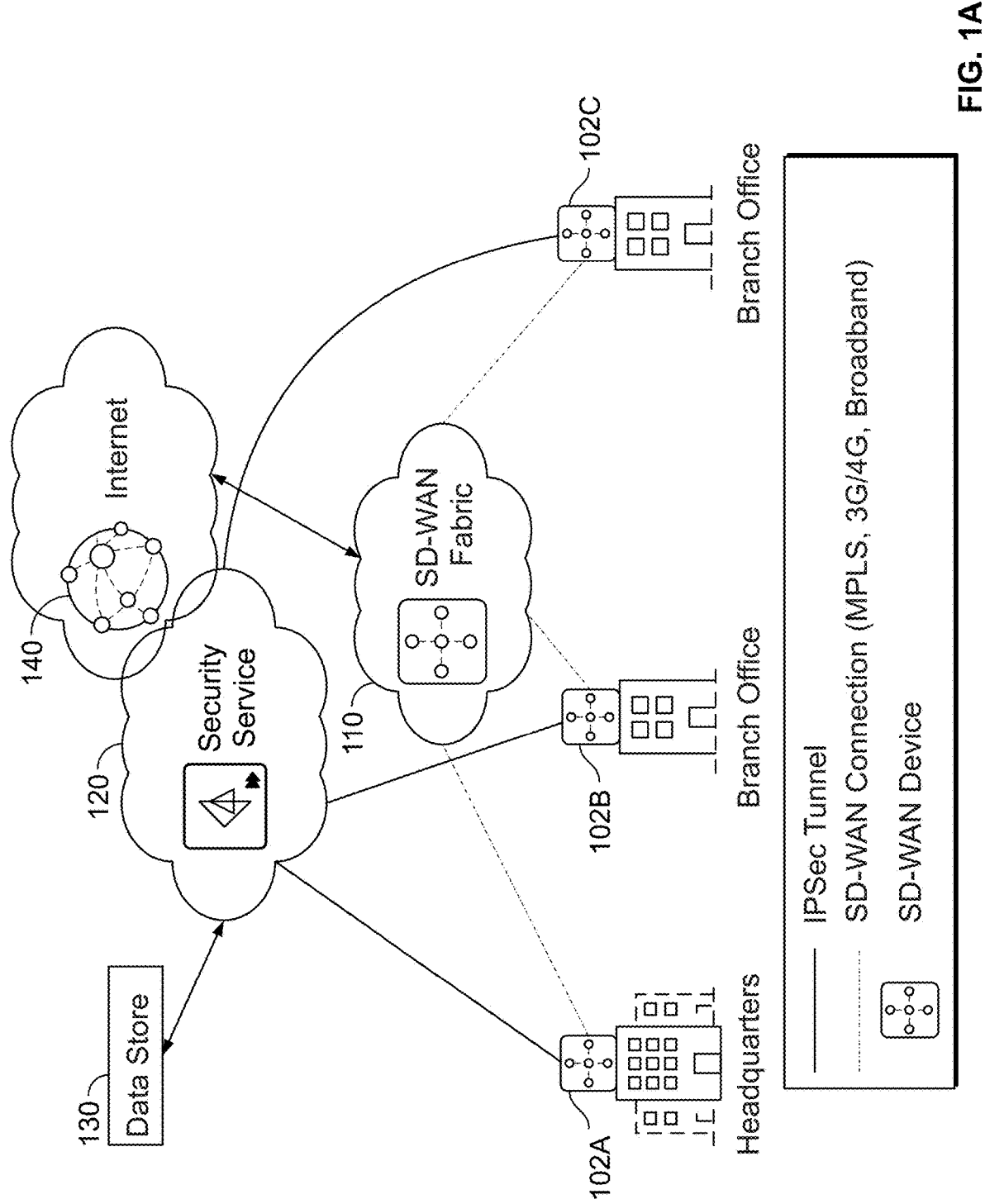
FIGS. 1A and 1B are example system diagrams of a Secure Access Service Edge (SASE) environment in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using a conventional network load balancer (NLB) provided by a cloud service provider or by any load balancer vendors, the network load balancer is not secure networking protocol friendly such as, for example, the IPSec protocol. The network load balancer includes limitations such as:

Inefficient load balancing, because traffic can only be distributed based on a number of tunnels, all of the tunnels do not carry an equal amount of traffic, and tunnel traffic characteristics change over time. Weighted NLBs can only steer new connections to a lightly loaded backend, but they cannot move existing connections/tunnels from one backend to a different backend without causing a tunnel reset.

The NLB can steer any tunnel to any backend. As a result, each backend must be capable of servicing any tunnel. This capability creates a configuration scale management issue for each backend.

Multiple tunnels from the same branch can be connected to different backends. The customer can use multiple tunnels from the same branch to a cloud service to address a per tunnel capacity, redundancy for circuit failure, having more than one network element sending traffic to the cloud service, etc. Also, the mapping of multiple tunnels from the same CPE to a single backend is required to support: aggregate bandwidth from a branch, per branch Quality of Service (QOS) committed information rate (CIR)/peak information rate (PIR), equal-cost multi-path (ECMP) tunnels with a single border gateway protocol (BGP) peer.

When SNAT cannot be performed, symmetric return and intelligent distribution are to be performed. As an example, using a security layer with two cloud routers including router 1 and router 2 connected to a data center, when traffic comes in from router 1 to go to the data center, and the data center responds via router 2 because of the routing policy, symmetric return cannot be satisfied in this scenario.

The desired bandwidth exceeds capacity of the backends.

As such, new and improved load balancing solutions for IPSec traffic or other encrypted tunnels for cloud service providers are needed.

Accordingly, various techniques for providing new and improved load balancing solutions for cloud service providers are disclosed, such as for cloud security service providers (e.g., Secure Access Service Edge (SASE) providers) and/or other cloud service providers.

Specifically, the disclosed techniques include providing load balancing using a network load balancer (NLB) that includes a network processing layer. The NLB distributes the load on the tunnel boundary to the network processing layer. The network processing layer terminates a secure protocol session (e.g., using an IPSec tunnel or another secure protocol tunnel can similarly be used) and distributes overlay traffic of flows to the next layer.

As such, the disclosed new and improved NLB solution for secure network traffic provides the following example benefits:

In the event that more than one tunnel from a single branch ends up on two different network nodes, one tunnel can be steered to be received on the network node processing the other tunnel before the other network node begins processing the one tunnel, so the more than one tunnel from the single branch are co-located on the same network node. As a result, a single BGP session over multiple tunnels can occur from the same branch.

Given that the secure protocol is terminated, the NLB distributes tunnel content to the next layer based on the inner flow providing a more balanced load distribution.

Given that the traffic is steered to an appropriate network processing node, tunnel configuration information for all of the tunnels does not need to be stored on all of the network processing nodes.

Service level agreements (SLAs) and QoS can be applied at the branch level instead of being limited to the tunnel level.

More even distribution of traffic to backend instances.

Automatically scales an oversubscribed backend more efficiently.

In some embodiments, a system/method/computer program product for load balancing secure network traffic includes monitoring network traffic for one branch of a plurality of branches for an enterprise network, and splitting the network traffic of the one branch into a plurality of network segments based on a determination that the network traffic exceeds traffic capacity of at least one security processing node (SPN) of a plurality of SPNs using a network load balancer (NLB) in communication with a plurality of Network Processing Nodes (NPNs), the plurality of monitored branches being distributed to the plurality of SPNs via a plurality of tunnels.

In some embodiments, the splitting of the network traffic of the one branch into the plurality of network segments comprises: determining whether the network traffic of the one branch exceeds the traffic capacity of the at least one SPN, the network traffic of the one branch being associated with at least one prefix, and in response to a determination that the network traffic of the one branch exceeds the traffic capacity of the at least one SPN, splitting the at least one prefix into a plurality of prefixes.

In some embodiments, the splitting of the at least one prefix into the plurality of prefixes comprises: determining whether a subnet mask associated with the at least one prefix is 32 bits, and in response to a determination that the subnet mask associated with the at least one prefix is 32 bits, omitting to split the at least one prefix.

In some embodiments, a subnet mask associated with the at least one prefix has a smaller number of bits than a subnet mask associated with one prefix of the plurality of prefixes.

In some embodiments, the splitting of the network traffic of the one branch into the plurality of network segments comprises: performing source-based network address translation (SNAT) on Internet-bound network traffic.

In some embodiments, the splitting of the network traffic of the one branch into the plurality of network segments comprises: omitting to perform the SNAT on traffic heading towards private apps or enterprise-bound traffic.

In some embodiments, each prefix of the plurality of prefixes is associated with a network segment.

Figure 1B:
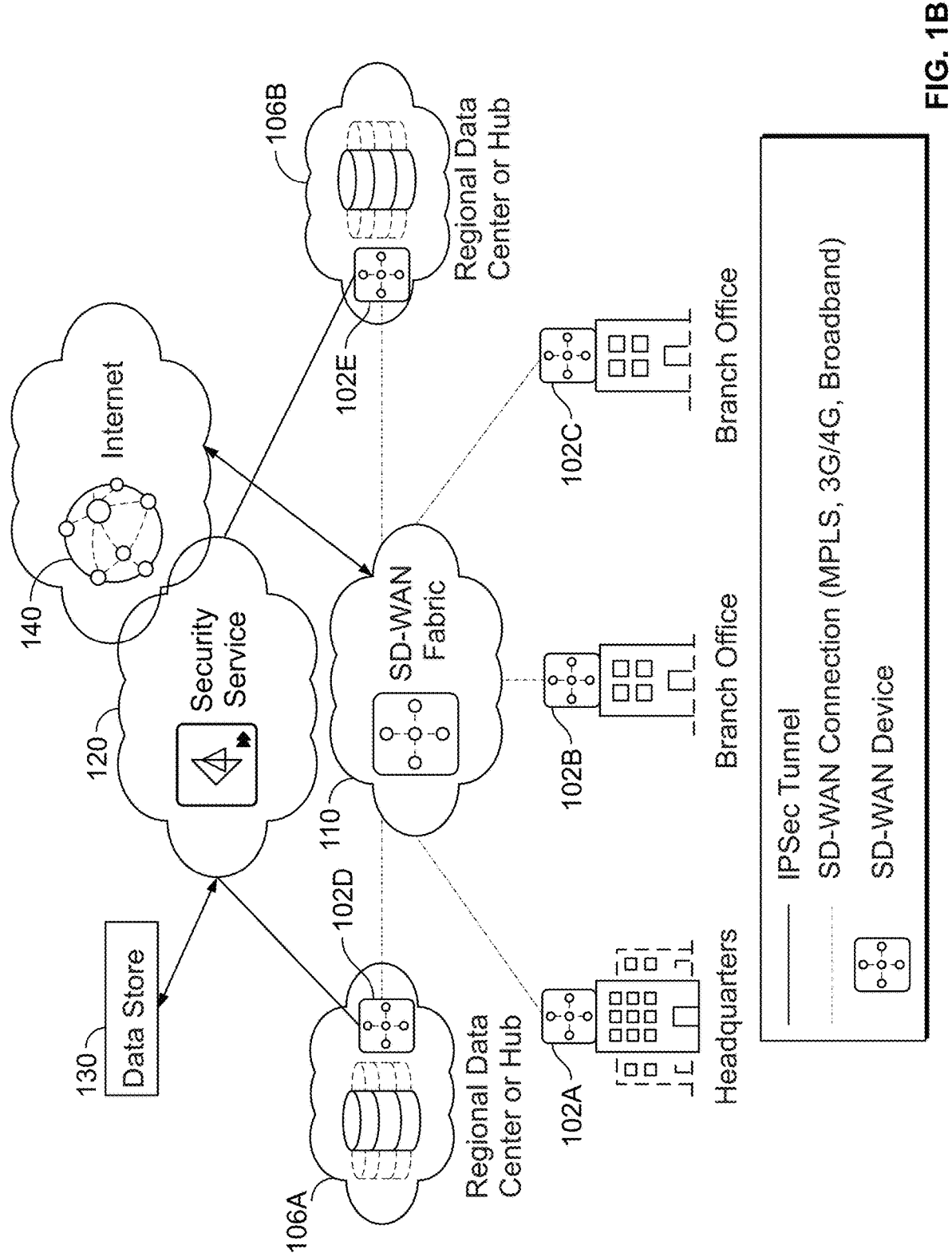

FIGS. 1A and 1B are example system diagrams of a Secure Access Service Edge (SASE) environment in accordance with some embodiments. These example system diagrams generally illustrate a security service for securing branch office (e.g., remote networks (RNs)) and headquarter sites as well as remote users (e.g., Rus) with SD-WAN connections in communication with a security service (e.g., a cloud-based security service).

Generally, a secure access service edge (SASE) brings together networking and network security services in a single cloud-based platform. This way, organizations can embrace cloud and mobility while reducing the complexity of dealing with multiple point products as well as saving IT, financial, and human resources.

For example, an SASE solution can generally include networking capabilities that an enterprise already uses. SASE can integrate the following networking features into a cloud-based infrastructure: SD-WAN edge devices, VPN services, and web proxying, which are each further described below.

Software-defined wide area network (SD-WAN) edge devices can provide easier connectivity for branch offices. With SASE, these devices are connected to a cloud-based infrastructure rather than to physical SD-WAN hubs located in other locations. By moving to the cloud, enterprises can eliminate the complexity of managing physical SD-WAN hubs and promote interconnectivity between branch offices.

Virtual private network (VPN) services incorporated by an SASE solution enable enterprises to route traffic through a VPN (e.g., using IPSec tunnels) to the SASE solution, and then to any application in the public or private cloud, delivered via Software as a Service (Saas), or on the Internet. Traditional VPN was used for remote access to the internal data center, but it is typically not optimized for the current/evolving cloud computing environment.

Web proxying provides an alternate means of securely connecting users to applications by inspecting web-based protocols and traffic. Proxies were typically used for web security enforcement, but due to their inherent security limitations, they are now typically used as an architectural alternative for device traffic that cannot be fully inspected (e.g., personal devices that cannot accept an endpoint agent to force all web and non-web traffic through security inspection). When implemented as part of an SASE solution, proxies can offer organizations with legacy architectures an easier way of adopting the more robust security capabilities SASE has to offer.

In addition, SASE can incorporate the network security service tools enterprises have generally relied upon in prior computing environments. In a comprehensive SASE solution, the following security services can be delivered through a cloud-based infrastructure: zero trust network access (ZTNA), firewall/security as a service (FWaaS), secure web gateways (SWG), data loss prevention (DLP), and cloud access security broker (CASB), which are each further described below.

Zero Trust Network Access (ZTNA) applies the Zero Trust secure computing approach (e.g., never trust, always verify) to the cloud computing environment. For example, ZTNA can be applied to require that every user authenticate to access the cloud, restricting access and minimizing the risk of, for example, data loss. However, ZTNA solutions based on a software-defined perimeter (SDP) model can lack content inspection capabilities needed for consistent security protection for enterprises. Also, moving to a cloud-based SASE infrastructure can eliminate the complexity of connecting to a gateway. For example, users, devices, and apps can be identified no matter where they connect from, and the below further described ZTNA solutions of protecting applications can be applied across all services, including data loss prevention (DLP) and threat prevention.

Firewall as a service (FWaaS) provides next-generation firewall features in the cloud computing environment (e.g., also referred to herein as the cloud), thereby removing the need for physical hardware at branch and retail locations. For example, SASE solutions can integrate FWaaS into its cloud-based platform, allowing simplified management and deployment.

Secure web gateways (SWG) can, for example, be implemented to prevent employees and devices from accessing malicious web sites, enforce acceptable use policies before users can access the Internet, and block inappropriate content. As such, an SASE solution can include SWG to protect users no matter their location.

Data loss prevention (DLP) can be implemented to prevent sensitive data from being shared or misused by authorized users and alerts key stakeholders when policies are violated. DLP is generally useful for enterprises that need to maintain compliance with regulations, such as HIPAA, PCI DSS, and/or GDPR. With an SASE solution, DLP tools can be integrated into the cloud platform, eliminating the need for a separate DLP gateway. DLP can be applied inline as well as search data at rest, whether in cloud-based or SaaS-based data storage.

Cloud access security broker (CASB) technology can provide enterprises visibility into where their data resides, enforces enterprise policies for user access, and protects data against unauthorized access. CASBs can also provide a gateway for an enterprise's SaaS provider to the enterprise's employees through cloud-based security policies. As such, SASE solutions can integrate CASB services into a single cloud-based platform to allow enterprises to manage access more easily to their applications (apps) and data.

Further, as organizations grow across different geographical locations, choosing a network becomes a delicate balancing act of cost, performance, and security. A software-defined WAN (SD-WAN) simplifies the management and operation of a wide area network (WAN) by separating the networking hardware (the data plane) from its control mechanism (the control plane). SD-WAN technology allows companies to build higher-performance WANs using lower-cost Internet access. With the adoption of SD-WANs, organizations are increasingly connecting directly to the Internet, introducing security challenges to protect remote networks and mobile users. Additionally, the deployment of Software as a Service (SaaS) applications (e.g., including SASE solutions) has significantly increased, with many organizations directly connecting to such cloud-based SaaS applications, introducing additional networking and security challenges. The adoption of SD-WAN technology introduces many benefits in cost savings and enables organizations to be agile and optimized. However, it also makes branch offices and remote users targets of cyber-attacks and other technical networking and security challenges as similarly described above.

SD-WAN security generally is desired to be as flexible as the networking, but it is also technically challenging to adapt traditional security approaches to such evolving SD-WAN networking in various enterprise network environments such as shown in FIGS. 1A and 1B as will be described below. In a traditional campus network design, there is a full stack of network security appliances at the Internet perimeter that can protect the branch, which is true if all traffic is brought through the core network to pass through such a full stack of network security appliances at the Internet perimeter. However, SD-WANs do not always use this network architecture, such as if the SD-WANs are configured to integrate cloud/SaaS applications.

An alternative to the traditional approach is to deploy network security appliances at the branch office. However, this traditional approach complicates the deployment as it brings the security device/element closer to the branch office.

SD-WAN technology generally uses the principles of software-defined networking (SDN) and separates the control plane and the data plane. Based on this principle, SD-WAN deployments generally include the following components: (1) a controller that administrators use to centrally configure WAN topologies and define traffic path rules; and (2) SD-WAN edge devices (e.g., mobile user (MU) gateways and remote network (RN) gateways), either physical or virtual, that reside at every site and function as the connection and termination points of the SD-WAN fabric.

In an example SD-WAN Type 1 deployment (e.g., branches and headquarters deployment), at each branch site, organizations can deploy one or more SD-WAN edge devices and connect them to form an SD-WAN fabric or SD-WAN overlay. Administrators use the SD-WAN controller, based either in the cloud or on the organization's premises, to manage and configure these edge devices and define the traffic forwarding policies at each site.

Referring to FIG. 1A for an example deployment (e.g., branches, headquarters, and regional data center deployment), the IPSec tunnels are set up between each of the SD-WAN edge devices 102A, 102B, and 102C at each data center (e.g., including IPSec tunnels between the SD-WAN edge device(s) at each branch and headquarters site) and a security service 120 (e.g., a cloud-based security service, such as provided via Prisma Access, which is a commercially available cloud-based security/SASE service from Palo Alto Networks, Inc. headquartered in Santa Clara, CA). This example system diagram is an example deployment for securing traffic from each branch site with one WAN link (Type 1) as shown at 110. SD-WAN Fabric 110 and security service 120 are each in communication with the Internet 140. Security service 120 is in communication with a data store 130 (e.g., a data store for network/security logging data, such as a Cortex™ data lake, which is commercially available from Palo Alto Networks, Inc. headquartered in Santa Clara, CA).

Specifically, this architecture adds SD-WAN devices in regional data centers, along with the SD-WAN devices at each branch and headquarters site. These regional data centers can be public or private cloud environments. SD-WAN devices at the regional data center aggregate network traffic for smaller sites in that region. For example, organizations can use this deployment when there are multiple regional branch sites with lower bandwidth connections to the Internet.

Referring to FIG. 1B, for another example deployment (e.g., branches, headquarters, and regional data center), the IPSec tunnels are set up between the SD-WAN edge device at each data center (e.g., including at SD-WAN devices 102D and 102E) and a security service 120 (e.g., a cloud-based security/SASE service, such as provided via Prisma Access, which is a commercially available cloud-based security service from Palo Alto Networks, Inc. headquartered in Santa Clara, CA). This example system diagram is an example deployment for securing SD-WAN deployments with Regional Hub/POP architectures. As shown, the IPSec tunnels are set up between each of the regional data centers or hubs 106A and 106B and the security service 120.

A common network architecture today is to tunnel traffic between an enterprise's headquarters and branches over either MPLS links or dedicated encrypted VPN links. As more services are cloud-based (e.g., including SaaS solutions, such as Microsoft Office 365®, Salesforce®, etc.), and more information is available on the Internet, it generally makes less sense to tunnel traffic back to an aggregation point before routing it to its final destination. Breaking out traffic locally from the branches (e.g., as opposed to an on-premises appliance) generally allows traffic to reach its destination faster and makes a more efficient use of bandwidth. However, allowing traffic directly between devices in the branch and the Internet also introduces new networking and technical security challenges with respect to effectively and efficiently providing private application access for these connectivity solutions as similarly described above.

As such, the disclosed techniques for wildcard based private application access (e.g., for an SASE environment) can be performed in these example SD-WAN architectures and a security service/SASE environment as will be further described below with respect to various embodiments.

Figure 2A:
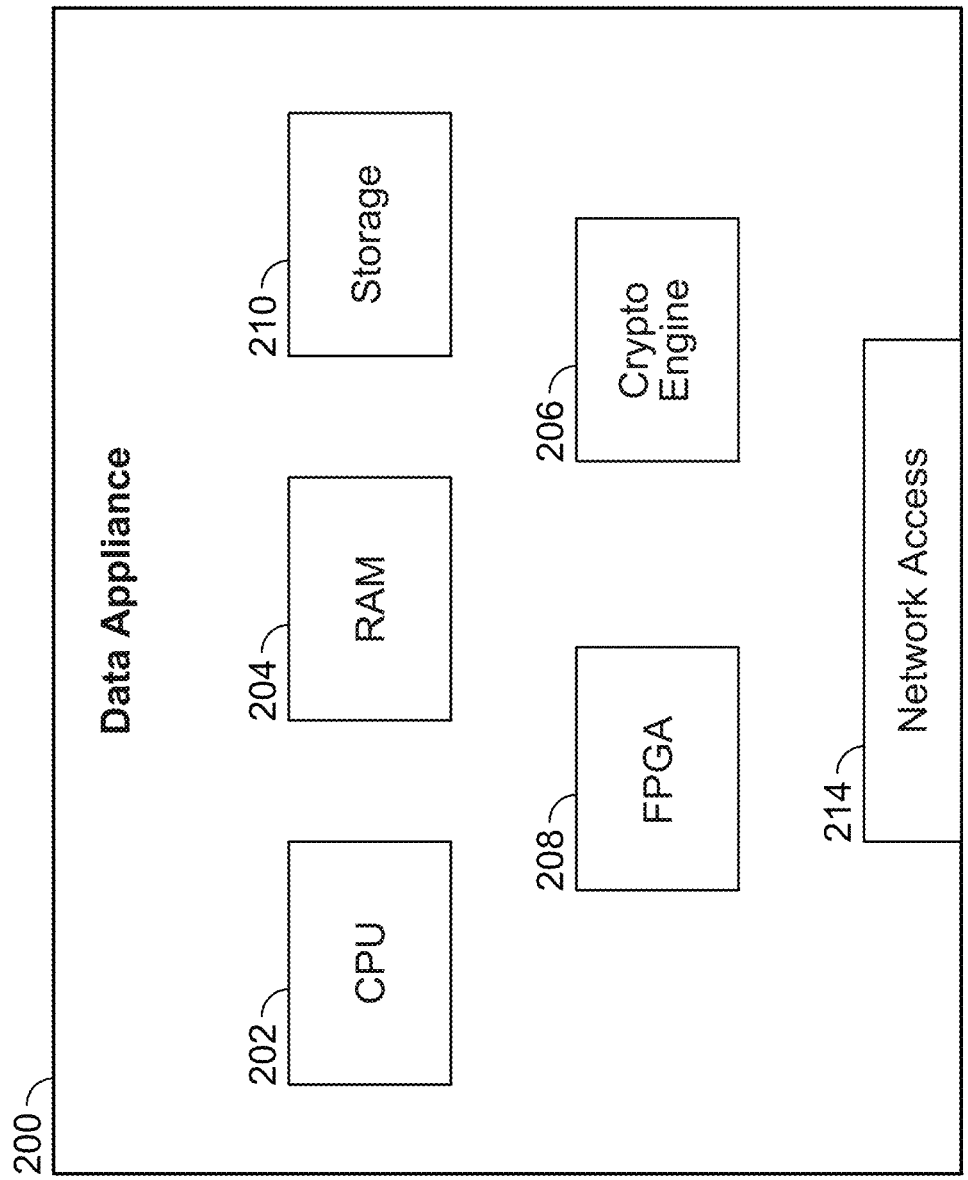
FIG. 2A illustrates an embodiment of a network gateway in accordance with some embodiments.

An embodiment of a network gateway 200 is shown in FIG. 2A (e.g., such as network gateways/SD-WAN edge devices shown at 102A-C in FIGS. 1A and 1B). The example shown is a representation of physical components that can be included in network gateways/SD-WAN edge devices shown at 102A-C in FIGS. 1A and 1B if the network gateway is implemented as a data appliance, in various embodiments. Specifically, the data appliance includes a high-performance multi-core Central Processing Unit (CPU) 202 and Random Access Memory (RAM) 204. The data appliance also includes a storage 210 (e.g., one or more hard disks or solid-state storage units). In various embodiments, the data appliance stores (e.g., whether in RAM 204, storage 210, and/or other appropriate locations) information that is used in monitoring an enterprise network and implementing the disclosed techniques, such as for SD-WAN path selection as similarly described above with respect to FIGS. 1A and 1B. Examples of such information can also include application identifiers, content identifiers, user identifiers, requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 206 configured to perform encryption and decryption operations, and one or more Field Programmable Gate Arrays (FPGAs) 208 configured to perform matching, act as network processors, and/or perform other tasks. The data appliance also includes a network access 214.

Functionality described herein as being performed by the data appliance can be provided/implemented in a variety of ways. For example, the data appliance can be a dedicated device or set of devices. The functionality provided by the data appliance can also be integrated into or executed as software on a general purpose computer, a computer server, a gateway, and/or a network/routing device. In some embodiments, at least some services described as being provided by the data appliance are instead (or in addition) provided to a client device (e.g., an endpoint device, such as a laptop, smart phone, etc.) by software executing on the client device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; Microsoft Office 365 related traffic; and so on.

The disclosed system processing architecture can be used with distinct types of clouds in different deployment scenarios, such as the following: (1) public cloud; (2) private cloud on-premises; and (3) inside high-end physical firewalls. Some processing power can be allocated to execute a private cloud (e.g., using the management plane (MP) in the Palo Alto Networks PA-5200 Series firewall appliances).

Figure 2B:
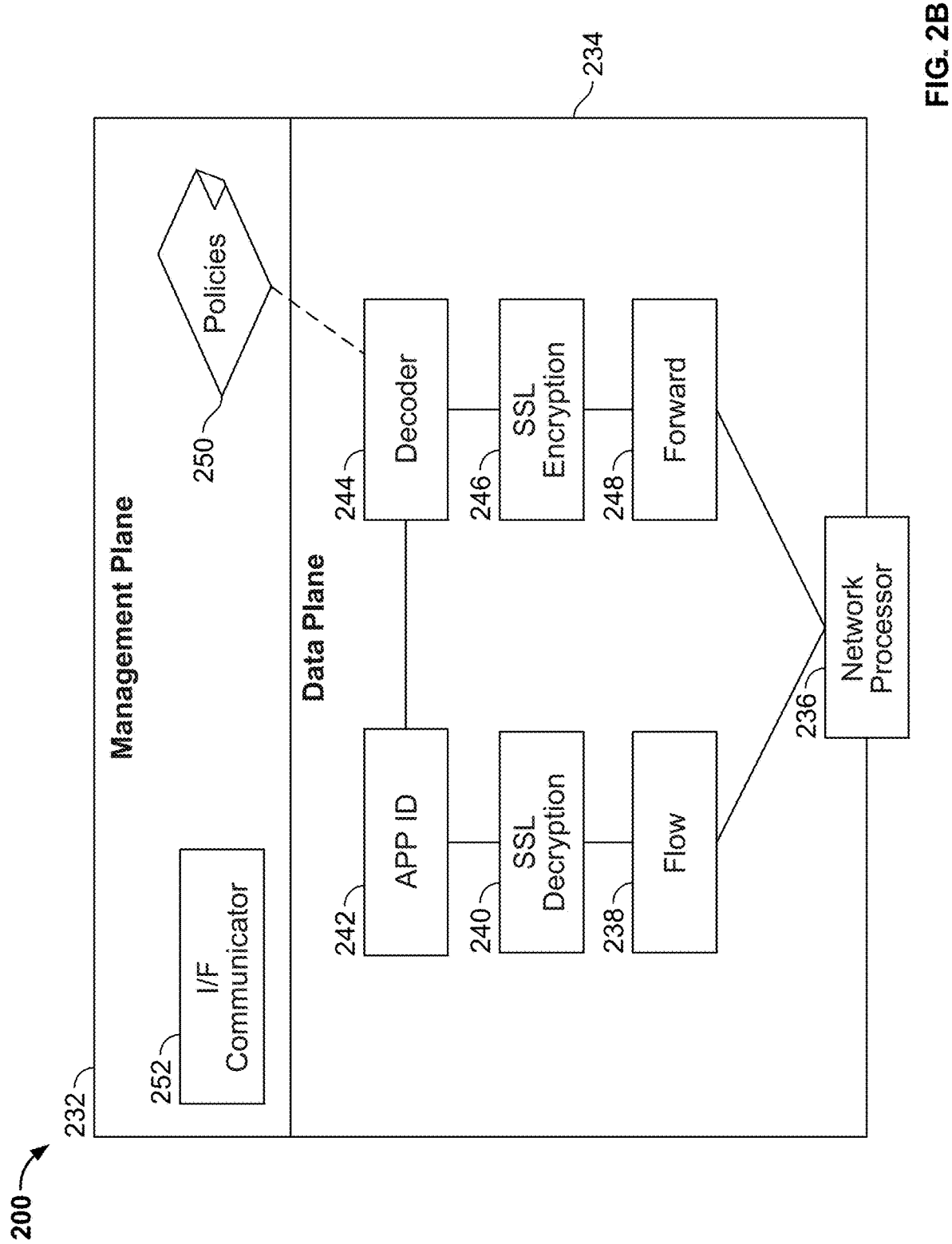
FIG. 2B is a functional diagram of logical components of an embodiment of a data appliance.

FIG. 2B is a functional diagram of logical components of an embodiment of a data appliance. The example shown is a representation of logical components that can be included in network gateway 200 in various embodiments (e.g., such as network gateways/SD-WAN edge devices shown at 102A-C in FIGS. 1A and 1B). Unless otherwise specified, various logical components of network gateway 200 are generally implementable in a variety of ways, including as a set of one or more scripts (e.g., written in Go, Java, Python, etc., as applicable).

As shown, network gateway 200 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from various client devices (e.g., such as client devices at branch/remote offices), and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help network gateway 200 inspect and control SSL/TLS and SSH encrypted traffic, and thus help to stop threats that might otherwise remain hidden in encrypted traffic. Decryption engine 240 can also help prevent sensitive content from leaving an enterprise/secured customer's network. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control distinct options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by network gateway 200. For example, a user may initially browse to a corporate Wiki (classified based on the URL visited as "Web Browsing-Productivity") and then subsequently browse to a social networking site (classified based on the URL visited as "Web Browsing-Social Networking"). Distinct types of protocols have corresponding decoders.

Based on the determination made by application identification engine 242, the packets are sent, by decoder 244, to an appropriate decoder configured to assemble packets (e.g., which may be received out of order) into the correct order, perform tokenization, and extract out information. Decoder 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 250 are received and stored in management plane 232. Policies 250 can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. As another example, policies 250 can include various SD-WAN path selection policies/rules, such as similarly described above with respect to FIGS. 1A and 1B. An interface (I/F) communicator 252 is provided for management communications (e.g., via (REST) APIs or other communication mechanisms).

By building an association with firewalls and users, a lot of stickiness is created. For example, if a firewall is deactivated and a new replacement firewall is brought in, the IP address of the new replacement firewall remains the same as the original firewall. The firewall can be a virtual firewall (software-based firewall) or a hardware-based firewall. To expand a network, a load balancer can be placed in front of the firewalls, so that the firewalls can act as a service and the customer only talks to a load balancer, which basically distributes the traffic to the firewalls.

For conventional load balancers used by cloud providers, the load balancers are limited when the secure network traffic comes into a cloud service because encryption makes it difficult for conventional load balancers to access inner contents of packets of the secure network traffic. In some embodiments, the secure network traffic includes, for example, an IPSec protocol or a Geneve protocol. For example, the secure network traffic comes into a load balancer via tunnels, but the tunnels are not of equal size. For conventional load balancers, the load balancers do not know how much data is within each tunnel because contents of the tunnels are encrypted.

For example, as more software firewalls are brought into the cloud service and the software firewalls are brought in as a service, instead of the customer pointing to a single firewall, now instead, the customer is connecting to a load balancing service which distributes network traffic to multiple software firewalls or software instances (e.g., a virtual and/or container implemented firewall solution provided as a cloud security service, such as SASE, such as also similarly described above).

Using an existing, typical network load balancer provided by a cloud service provider or by any load balancer vendors, the network load balancer has a variety of technical shortcomings. Examples of these technical shortcomings for such existing, typical network load balancers include inefficient load balancing, scaling limitations due to the amount of tunnel configurations that is generally required to be stored, branches having multiple tunnels, and desired bandwidth exceeding firewall capacity.

For the first issue, the load balancer can be inefficient in load balancing network traffic. For example, as encrypted traffic comes into the load balancer, the traffic forms tunnels, such as, for example, IPSec tunnels. Since the tunnels are created ad-hoc, not all tunnels are likely to be of equal size. As an example, a first tunnel can be a 10 gigabytes per second (Gbps) tunnel connecting through the load balancer and a second tunnel can be a 100 Mbps branch connecting through the load balancer. In some embodiments, a tunnel represents a connection from a branch to the cloud service. As an aspect, the load balancer sees only two tunnels (the first tunnel and the second tunnel) and the load balancer does not know that one of the two tunnels is 10 Gbps and the other of the two tunnels is 100 Mbps. So, if the load balancer starts to distribute based on the units of tunnels to the backends and not all of the tunnels are equal, then an issue occurs in that more polarized workloads occur where one worker or firewall or one unit of tunnel gets a fat pipe and the other worker or firewall or another unit of tunnel gets a thin pipe, so there are inefficiencies on the backends.

Conventionally, to address the inefficiency issue, a weighted load balancer can adjust the distribution of the tunnels where a backend can specify that if the backend is getting busy the tunnel can notify the load balancer that it is getting busy so that network traffic gets routed to a less busy backend. As an aspect, this rerouting does not apply to secure tunnels or IPSec tunnels because IPSec tunnels are typically long-lived. Also, the secure tunnels can change their throughput over time. Secure tunnels cannot be moved to another firewall during their midlife. The weighted load balancer works better when connections are short-lived and new connections regularly come in. The new incoming connections can be moved or assigned to appropriate firewalls so the firewalls can have balanced workloads. On the other hand, if tunnels have long-lived workloads, the tunnels cannot be moved or assigned to other firewalls easily. In other words, the weighted load balancer also does not efficiently perform load balancing in the case of secure networking protocols, such as, for example, the IPSec protocol or the Geneva protocol.

A conventional network load balancer (NLB) for load balancing IPSec tunnels cannot move an active connection from one firewall to another firewall. As an example, if a security platform or firewall becomes overloaded with 10 different connections from 10 different branches of an enterprise, moving active connections from one security platform to another security platform on your cloud-based security service cannot be easily moved. The security platform can be overloaded because the tunnel is an encrypted tunnel. Because the security platform cannot look into the contents (e.g., the headers and the contents of the tunnel are encrypted) of the encrypted tunnel, the security platform sees each encrypted tunnel as one unit.

As an example, when running load balancers in a cloud service, for example Google Cloud Platform (GCP), Amazon Web Services (AWS), Microsoft Azure, etc. which all provide load balancing capabilities to steer their traffic to various security platforms, the cloud services do not have the capability to perform load balancing based on the load of a secure tunnel. Because a secure tunnel is encrypted, a load balancer cannot review contents of a tunnel because packet headers and contents of packets are encrypted, so each tunnel is treated as one unit. These limitations exist for encrypted tunnels, and certain limitations can also exist for unencrypted tunnels.

In some embodiments, the load balancing can be performed before the secure tunnel is encrypted or a Man in the Middle (MitM) type technique is performed to decrypt the secure tunnel. However, not all of the limitations would be removed in these situations.

In some embodiments, certain service-level agreements (SLAs) or a certain characteristic is associated with an entire tunnel. As an example, in this case, a tunnel is associated with a branch connecting into a security platform. A customer may have a group of users associated with a branch behind that tunnel, and the group of users can include 10 different users or 100 different users depending on the size of the branch. As an example, one of the ACME corporation's offices could have 10 to 20 employees and their employees are on different machines which are connected to the cloud service.

So, a network administrator or a security administrator creates one pipe for the group of users, whether encrypted or unencrypted traffic is sent towards the security platform, and the one pipe has a certain SLA specifying a particular Quality of Service (QOS) for the branch. As an example, because the one pipe has a capacity limit, which users go into which pipe is also decided at random. As an aspect, the administrator still desires that the group of users (spread across more than one tunnel) is provided a fixed SLA, e.g., the branch having two tunnels must get a committed information rate (CIR) of 100 Mbps and a peak information rate (PIR) of one Gbps. To satisfy the SLA, load balancing needs to be performed at the level of the group of users. Also, the cloud service provider needs to satisfy the SLA at the branch-level whether the tunnels are encrypted or unencrypted.

For the second issue, load balancers are indiscriminate in distributing incoming tunnels. For example, the load balancers give an incoming tunnel to any worker on the backend. The load balancers perform a 3-tuple match, which analyzes the source IP address, the destination IP address, and the protocol for performing the load balancing. For example, with three workers or firewalls on the backend, for incoming traffic from a given branch, the load balancer could send traffic to a first worker on a first day, could send the same traffic to a second worker on the next day, etc. In other words, the load balancer does not always forward traffic for a given branch to a particular worker. A given sender or entity could wind up using a first worker or instance, a second worker or instance, a third worker or instance, etc. The given sender or entity is not deterministically forwarded to a specific worker or instance because the NLB is performing distribution and not routing. As the cluster of workers or instances becomes larger with the addition of more and more workers or instances, each worker or instance now needs the capability to receive traffic from any user or entity. Typically, a deployment starts with one instance and can grow to as large as forty instances.

On the other hand, regarding the number of senders, a range in the number of senders can be one sender to 10,000 senders. For each sender, the sender's corresponding tunnel can be decrypted. As an example, the security platform can apply the QoS to the tunnel, shaping to the tunnel, rate limiting to the tunnel, or any other tunnel configuration. In other words, each instance will need to have configured each tunnel and stores configuration information for each of the 10,000 tunnels because the instances do not know how the traffic is going to be distributed.

To increase the capacity of the number of connections connecting to a given service, more backend workers have to be added to be able to handle the increase in the horizontal scale. Because no control exists on the load distribution, each firewall or worker node or security platform needs to store or have access to the configuration information for any of the 10,000 tunnel connections. The storing of the configuration information of the connections creates a configuration scale issue. Because of the lack of control on the distribution of the traffic or traffic direction, the configuration scale issue is created on each worker node or security platform. In the present application, by controlling how the NLB distributes the traffic, the NLB deterministically distributes traffic to a first worker, deterministically distributes traffic to a second worker, deterministically distributes traffic to a third worker, etc. so that all of the 10,000 tunnels have specific destinations. In other words, due to the volume of tunnels, configuration data for all of the potential secure tunnels for conventional network load balancers are stored in each instance. Conventionally, when there are 10,000 tunnels and 10 instances for a cloud service, a total of 100,000 tunnel configurations can exist across each of the 10 instances.

The present application can allocate a predetermined 1,000 tunnels for a first instance, the next predetermined 1,000 tunnels for a second instance, the next predetermined 1,000 tunnels for a third instance, etc. In this case, up to only 1000 configurations are created per instance and not 10,000 configurations per instance for a total of 10,000 tunnel configurations stored across all of the instances. In another example, if there are 100,000 tunnels to be load balanced, a total of 100,000 tunnel configurations are stored across all of the instances. In some embodiments, each tunnel corresponds with a branch.

In an example use case, assume that a new company has 35,000 branches connecting all those branches into a set of NLBs. Conventionally, because there's no control over which branch connects to which instance, there is no allocation set up in advance. Instead, pre-provisioning 35,000 different tunnel configurations for a first instance, provisioning 35,000 different tunnel configurations for the second instance, etc. occurs. By storing 35,000 different configurations in each instance, a great deal of memory is occupied and each instance has a finite amount of memory. As a result, a total number of 35,000 tunnel configurations multiplied by the total number of instances will be stored across the instances because at least there is no determinism in distributing tunnels across a cluster of instances. A single instance's capacity to store tunnel configuration information determines the capacity for each instance of the cluster of instances.

In the present application, when horizontally scaling, dividing the load amongst a plurality of instances provides benefits over allowing each instance to be capable of handle all of the tunnels. Because if each instance is capable of handling all of the tunnels, there is a tremendous amount of overhead to provide this capability, and the network is limited by the maximum number of tunnels that a single instance can handle even though the cluster of instances can handle many more tunnels.

In the present application, a predetermined set of 1,000 tunnels can be provisioned for a first instance, a next predetermined 1,000 set of tunnels can be provisioned for a second instance, a next predetermined 1,000 set of tunnels can be provisioned for a third instance, etc. In other words, each instance is provisioned for a predetermined set of 1,000 tunnels. For example, a first instance handles tunnels 1 to 1000, a second instance handles tunnels 1001 to 2000, a third instance handles tunnels 2001 to 3000, . . . , a 35th instance handles tunnels 34001 to 35000. In other words, each instance only handles a portion of the entire number of tunnels. In some embodiments, each instance handles a non-overlapping range of tunnels.

As a third issue, there are scenarios where a customer from a given branch connects to more than one tunnel to the cloud service. Assume that there are two branches where one branch has more than one connection while the other branch only has one connection. In some embodiments, a customer, for the larger branch, will have multiple circuits connecting to the NLB for redundancy and for load balancing. For example, one connection goes over a wireless connection the other connection goes over the fixed wire. The larger branches can have more than one tunnel emanating from the same branch. As an example, the larger branch has two tunnels connecting to the NLB. In the example, one of the tunnels can be for a failover and the other tunnel can be an active connection, or both tunnels can be active. For example, equal-cost multi-path (ECMP) tunnels are used. One example is if a tunnel has a finite limit of one Gbps per tunnel, but the branch requires, for example, four Gbps. As a result, the branch needs to provision four tunnels of one Gbps each to provide the four Gbps capacity. As an example, different tunnels can be handled by different carriers. As an aspect, at a second level configuration, an SLA is not provided per tunnel but instead an SLA is provided to the branch, so the branch is guaranteed a specific number of resources. For example, the traffic of the tunnel can be shaped, the rate can be limited, etc.

Typically, a committed rate or a peak rate for an entire branch is configured. A tunnel is a way for sending traffic from a branch. The NLB does not know that these four tunnels are coming from the same branch. The NLB can send a first tunnel to a first worker, a second tunnel to a second worker, a third tunnel to a third worker, and a fourth tunnel to a fourth worker. The NLB performs the load balancing at the tunnel level. The NLB does not take into consideration any association between the tunnels.

One example is if the branch wished to apply QoS in a distributed fashion, for example, the branch wanted to provide no more than 1 GB of bandwidth to the cloud service. The NLB with four different tunnels and four different instances on the backend performing the metrics or the metering on the backend in a distributed fashion can become very tricky because the four different tunnels are dynamically changing in real time. In other words, a lot of information for each tunnel needs to be constantly exchanged between the other tunnels and the NLB in real time. Ideally, the NLB has some control when distributing tunnels that are coming from the same source or the same logical source, and sends all of those tunnels having the same source to the same backend worker. As a result, applying QoS will be easier because the same backend worker will have all of the metrics and/or the metering information.

Furthermore, a second branch can come online and be forwarded to a second worker and a third branch can come online and be forwarded to a third worker. The set of tunnels associated with each branch which originate from the same source can be distributed to the same worker.

In summary, conventional load balancers have at least four issues, which include 1) unequal distribution to the backend because not all tunnels have similar throughput, where not all tunnels are equal because some tunnels have a thick pipe, some tunnels have a thin pipe, or the tunnel throughput changes over time, 2) since there is no control on which tunnels will land on which backend, there is configuration scale issues, 3) if you have multiple tunnels, originating from the same source, there is no control where each tunnel ends up landing on the backend, and 4) desired bandwidth from a source branch exceeds a single firewall capacity.

Figure 3:
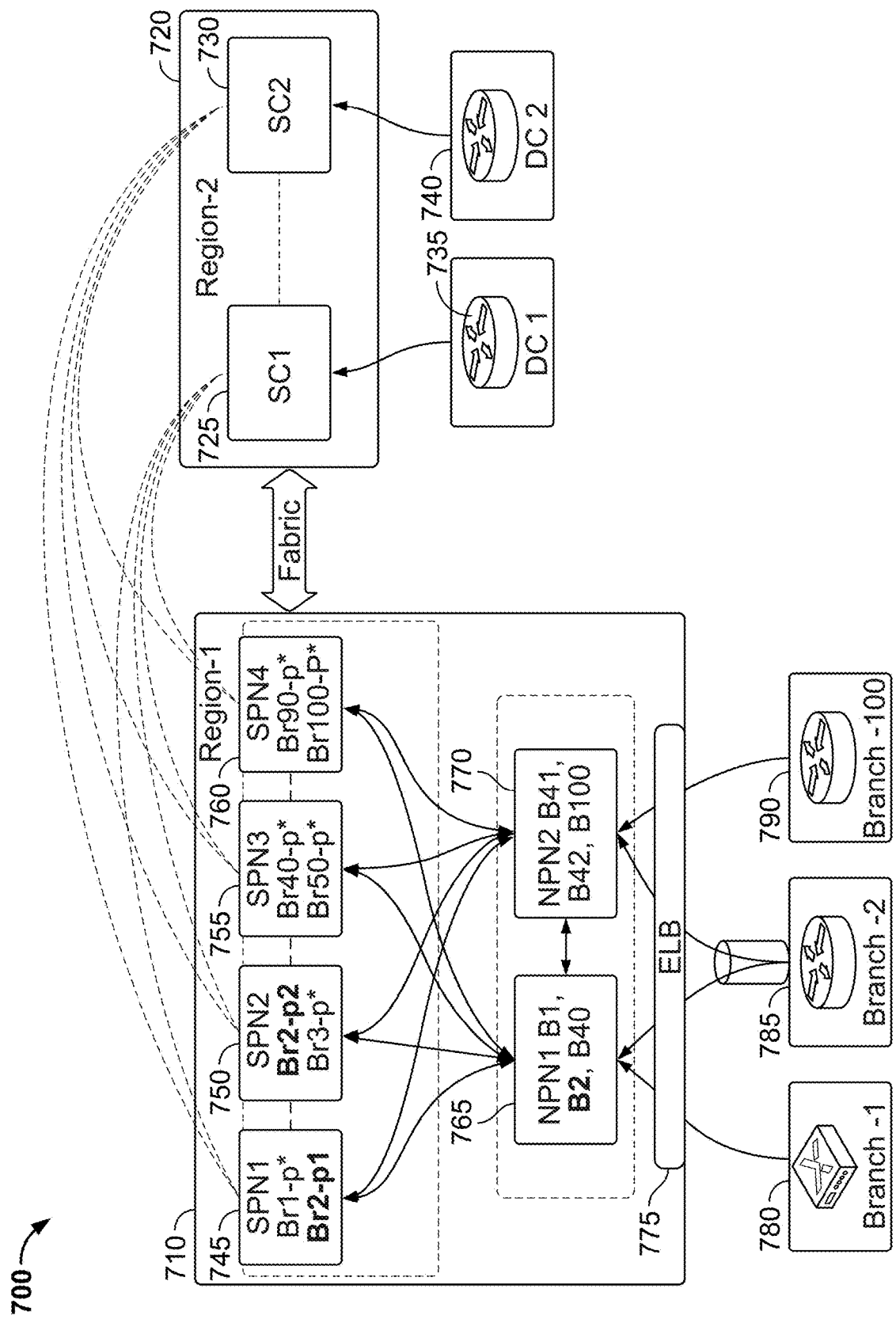
FIG. 3 is a system diagram overview of an example of a cloud-based security for load balancing secure network traffic in accordance with some embodiments.

FIG. 3 is a system diagram overview of an example of a cloud-based security for load balancing secure network traffic in accordance with some embodiments. In some embodiments, a network fabric 700 includes a first region (region-1) 710 and a second region (region-2) 720. In some embodiments, region-1 710 is a cloud security service. In some embodiments, the first region 710 includes a first security processing node (SPN1) 745, a second security processing node (SPN2) 750, a third security processing node (SPN3) 755, and a fourth security processing node (SPN4) 760, and the second region 720 includes cloud router 1 (SC1) 725 and cloud router 2 (SC2) 730. In some embodiments, the SC1 725 connects to a first data center (DC1) 735, and the SC2 730 connects to a second data center (DC2) 740. SPN1, SPN2, SPN3, and SPN4 communicate with a first network processing node (NPN1) 765 and a second network processing node (NPN2) 770. NPN1 765 and NPN2 770 are load balanced by elastic load balancer (ELB) 775, which distributes network traffic to branch-1 780, branch-2 785, . . . , and branch-100 790.

In the example, the first region 710 corresponds with the US East including a cluster of security processing nodes and the second region 720 corresponds with the US West including a cluster of cloud routers (SCs). The cluster of SCs includes a cloud router 1 (SC1) 725 and a cloud router 2 (SC2) 730. The cluster of security processing nodes includes SPN1 745, SPN2 750, SPN3 755, and SPN4 760 via the ELB 775. Branches from the first region 710 would connect through the cluster of SPNs. Branches from the second region 720 would connect through the cluster of SCs.

Conventionally, a branch would connect directly to an SPN, and the branch would not connect through a load balancer and would directly connect to a firewall or SPN. In the present application, since there are many branches, a load balancer can be used to hide how many SPNs or firewalls are used.

The present application introduces a new terminology called network processing nodes (NPNs), which does not explicitly deal with the security aspects but deals with networking aspects. As an example, the firewall is split into two portions, the first portion includes the NPNs for network processing and the second portion includes the SPNs for security processing.

The present application includes a three-level stack. At a first level, a load balancer sends traffic to a second level or layer that includes an NPN, which includes a network processing layer called an NPN layer, which does not involve any security and only deals with the networking portion, and then a third layer includes a security layer called an SPN layer.

As the traffic comes in, assume that one branch is a thin branch and the other branch is a thick branch. From a load balancer's point of view, the ELB 775 does not know that branch-1 (B1) 780 is going to send a small amount of traffic or branch-100 (B100) 790 is going to send a larger amount of traffic than branch-1 (B1) 780 or vice versa.

In FIG. 3, branch-2 (B2) 785, using the ELB 775, is sending and receiving network traffic via multiple NPNs including NPN1 765 and NPN2 770. The ELB 775 provides the tunnels to a networking layer including NPN1 765 and NPN2 770, and the networking layer sends the networking traffic to the security layer including SPN1 745, SPN2 750, SPN3 755, and SPN4 760. As the network increases in capacity, one or more instances can be added to the cluster. As an example, the cluster includes NPN1 765, NPN2 770, NPN3 (not shown), and NPN4 (not shown), and the ELB 775 will give the networking traffic to a designated NPN.

As an example, a network load balancer distributes the traffic towards the NPNs. The NPNs do not have control over the network traffic. Assume a priori that network traffic for branch-1 (B1) and branch-2 (B2) to branch-40 (B40) are directed by NPN1 765 and network traffic for branch-41 (B41) to branch-100 (B100) are directed by NPN2 770. Because each branch of B41-B100 has lighter network traffic than each branch of B1-B40, the network traffic for B41-B100 is directed by NPN2 770. Because each branch of B1-B40 has a heavier amount of traffic than each branch of B41-B100, the network traffic for B1-B40 are directed to NPN1 765. The network layer can be preconfigured a priori. In this example, 40 tunnels are configured to be directed by NPN1 765 and 60 tunnels are configured to be directed by NPN2 770. A hundred tunnels (B1-B100) do not need to be configured for both NPNs, no decryption is performed, and no processing is occurring. The NPN only looks at the tunnel header before determining where to send the tunnel. In some embodiments, multiple tunnels from the same branch can be redirected to the same NPN. In some embodiments, the branches directed to NPN1 are non-overlapping the branches directed to NPN2.

Conventional load balancers look at header information to perform the distribution. From the conventional load balancer's perspective, all tunnels look similar, so each tunnel is treated as 1 unit. Also, conventional load balancers cannot differentiate whether network traffic is coming from B1 or B2.

In the present application, each NPN is given the additional responsibility of performing the network load balancing. As an example, if NPN2 770 receives a tunnel from branch-4 that should get processed by NPN1 765, NPN2 770 redirects the tunnel to NPN1 765 because the NPNs share tunnel-ID to NPN mapping across all of the NPNs.

In another example, branch-2 (B2) 785 has been sending two tunnels to a cloud provider. If the two tunnels are sent to different backends, aggregating the two tunnels and exchanging statistics for the two tunnels between the different backends can become very difficult to perform.

Assume that a first tunnel and a second tunnel are associated with B2, a load balancer 775 does not tell the NPNs (NPN1 765 and NPN2 770) to move that first tunnel for B2 and the second tunnel for B2 to the same NPN. Instead, the NPNs must communicate amongst themselves to move the tunnels to the same NPN without the involvement of the load balancer.

As an example, assuming that NPN3 (Not Shown) is part of a network and if NPN2 770 is busy, then NPN2 770 can send a new tunnel to NPN3 (Not Shown) or NPN1 765. As a result, a new tunnel can end up on NPN3 (Not Shown) because NPN2 770 was too busy to accept a new tunnel. As an aspect, the load balancer cannot move tunnels around. NPN2 770 cannot tell the load balancer to send the new tunnel to a specific backend instance because load balancers are typically not configured to balance tunnels at the tunnel levels. Load balancers are typically built for non-tunnel traffic.

In another example, for 100 branches (B1-B100), branches 1 to 10 (B1-B10) could go to NPN1, and the remaining 90 branches (B10-B100) could go to NPN2. Since a customer typically has some visibility into how much traffic a branch needs to handle, the NPNs can either dynamically change the configuration to balance the load or the NPNs can be statically configured.

In the second issue, not all backend instances need to have all the configuration information for all of the instances. In the example, NPN1 765 includes 40 different configurations for branch-1 to branch-40, and NPN2 770 includes 60 different configurations for branch-41 to branch-100. None of the NPNs store 100 different configurations for B1-B100. In some embodiments, each branch has one tunnel.

To address the third issue, if two tunnels from a branch end up being on the two different backends, one NPN is going to take one tunnel and redirect the one tunnel to link the one tunnel back to the designated NPN so that both tunnels are connected to the same backend.

At the NPN layer, the NPN layer is performing traffic steering and traffic control. The NPN layer decrypts the tunnels for all the users behind branch-1 780. The NPN layer can distribute the traffic back to any worker node. The NPN layer can perform a more granular load distribution. In the NPN layer, since the NPN layer decrypts the tunnel, the decrypted tunnel can be distributed to any worker node or SPN to process the tunnel. The firewall inspection can be performed at a worker node or SPN and a security policy can be applied before sending the contents of the decrypted tunnel to its final destination.

In some embodiments, with the NPN layer distributing the inner traffic, B1 780 has 10 users with five users (users 1, 2, 3, 4, and 5) associated with a first tunnel and five users associated with a second tunnel (users 6, 7, 8, 9, and 10). After the first tunnel is decrypted, the NPN can send traffic for user 1 to a first instance, traffic for user 2 to a second instance, etc.

In some embodiments, the NPN layer is the layer which is performing traffic direction to distribute tunnels into their predesignated home, decrypt or decapsulate the tunnels, and apply network-level rules to the tunnels, such as, for example, QoS, encryption, SLA, etc. The NPN layer can open a tunnel, extract, via decryption, the inner packets of the tunnel, and pass the packets to a third level or SPN level, which can perform security processing.

In the present application, the load balancer distributes traffic, for example, a branch having two or more tunnels. The load balancer sends a first tunnel's traffic through a first worker node, and the load balancer sends a second tunnel's traffic through a second worker node. Providers cannot provide a branch-level SLA. Instead, the provider can only provide a tunnel-level SLA because the provider cannot combine SLAs for two or more tunnels on two different worker nodes from the same branch to determine that the branch-level SLA for a branch is satisfied unless the two or more tunnels from the same branch are connected to the same worker node.

Although the NPN layer is performing load balancing, an external load balancer can still be added because there are multiple workers where the traffic provided is to be balanced. The reason is a given software stack or even a hardware stack can only process a limited amount of traffic. The load balancer just looks at the outer IP and hashes the five tuples to send the traffic to a destination endpoint. In other words, the load balancer needs to perform only a little amount of processing to distribute the traffic.

The NPN layer performs more processing than a load balancer. For example, the NPN layer performs IPSec decryption or decryption of another secure protocol, so the traffic may not be able to be processed using a single instance, and the traffic needs to be split up among multiple workers. Also, because decryption is performed by the NPN layer, the NPN layer can determine that the amount of traffic is going through a tunnel, and then perform a more efficient load balancing for distributing traffic because the NPN layer is not limited by the encrypted tunnels.

After the NPN layer performs the IPsec decryption, the NPN layer steers the traffic to the right destination. In addition to steering the traffic, the NPN layer performs QoS for a branch. The tunnel needs metering, a committed information rate (CIR), a peak information rate (PIR), etc. that are configured by an administrator.

Assume that there are two different NPNs and 100 branches. The two NPNs utilize a simple lookup table. For example, in the lookup table, the NPN redirects traffic destined for B1-B40 to NPN1 765 and traffic destined for B41-B100 to NPN2 770. The two NPNs make a dynamic decision to determine which branch should go to which instance. As example, the statistics need to be exchanged between the NPNs, etc.

Figure 4:
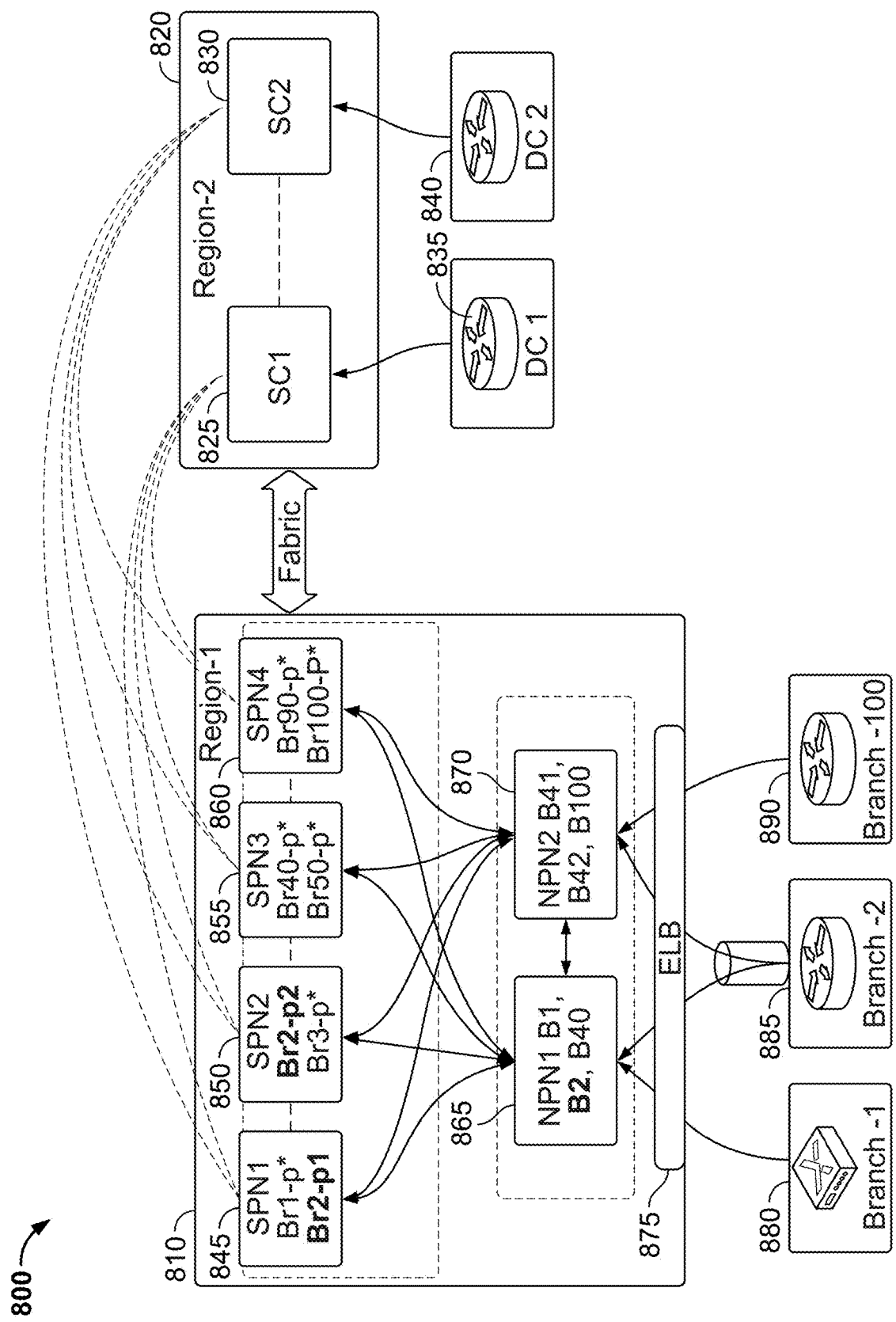
FIG. 4 is a system diagram overview of another example of a cloud-based security for load balancing secure network traffic in accordance with some embodiments.

FIG. 4 is a system diagram overview of another example of a cloud-based security for load balancing secure network traffic in accordance with some embodiments. In some embodiments, a network fabric 800 includes a first region (region-1) 810 and a second region (region-2) 820. In some embodiments, region-1 810 is a cloud security service. In some embodiments, the first region 810 includes a first security processing node (SPN1) 845, a second security processing node (SPN2) 850, a third security processing node (SPN3) 855, and a fourth security processing node (SPN4) 860, and the second region 820 includes cloud router 1 (SC1) 825 and cloud router 2 (SC2) 830. In some embodiments, the SC1 825 connects to a first data center (DC1) 835, and the SC2 830 connects to a second data center (DC2) 840. SPN1, SPN2, SPN3, and SPN4 communicate with a first network processing node (NPN1) 865 and a second network processing node (NPN2) 870. NPN1 865 and NPN2 870 are load balanced by elastic load balancer (ELB) 875, which distributes network traffic to branch-1 880, branch-2 885, . . . , and branch-100 890. In some embodiments, each of the networking components of FIG. 4 corresponds to a networking component of FIG. 3.

In FIG. 3, one company has network traffic from thousands of branches that were being load balanced for multiple nodes. The load balancer takes the traffic from the branches and intelligently distributes the traffic with certain constraints.

Referring back to FIG. 4, to address a fourth issue, network fabric 800 concerns the size of a tunnel. As an example, for simplicity, a different company has a few branches or only one branch, which is a large branch. The company sends 100 gigabytes per second (Gbps) of traffic because, for example, the large branch supports a data center, and the data center generates a large amount of traffic.

Typically, one backend worker or backend firewall cannot handle such a large amount of traffic because the traffic arrives as one tunnel. In the present application, network fabric 800 addresses the load balancing of large amounts of traffic coming from one branch. A large branch or fat branch can be defined as a branch that sends an amount of traffic that cannot be processed by a single firewall or node. In other words, the traffic from the fat branch is more than or exceeds a firewall capacity. In some embodiments, the firewall capacity is 1 Gbps. If the branch is sending more than 1 Gbps of traffic (more than the firewall capacity), distributing the traffic to multiple firewalls would be useful so that the traffic no longer exceeds the firewall capacity for any one firewall handling the traffic. To avoid this limitation, some customers limit their traffic from any one branch to not exceed 1 Gbps by breaking up their fat branches into multiple network segments, so that each network segment is less than 1 GB. The process of breaking up the fat branch into multiple network segments requires a great deal of time and effort for the customer.

The 1 Gbps limit exists because the security function is a bi-directional function. When traffic is sent in a client to server direction, for example, when a client tries to connect to web server acme.com, the web server acme.com returns the traffic via the same path so that the firewall can inspect the traffic that is sent and returned. In a multi-worker situation, traffic cannot be sent out via SPN1 745 and returned via SPN2 750 because security requires a symmetric return (in and out via the same SPN). Because the SPN layer analyzes client to server traffic and server to client traffic, the SPN layer has a limited capacity. One technique to increase the traffic capacity is to make each SPN of the SPN layer larger, but currently, no single computer has more than 16 cores or 32 cores and then the computer will soon hit a traffic capacity limit. Making a larger computer to increase the traffic capacity limit is limited because the large computer can also be very expensive. Instead, if the branch traffic is 10 Gpbs, 10 SPNs can be used to process branch traffic. The adding of 10 SPNs to the network can be referred to as horizontal scaling. Since the traffic is sent into the branch, the traffic returns back to the same SPN. If each SPN has a traffic capacity of 1 Gpbs, in the event that 10 SPNs are added to the network, the 10 SPNs have a traffic capacity of 10 Gpbs. Subsequently, the traffic needs to be controlled to be returned back to the same SPN that sent the traffic. The SPNs cannot be split into two groups of five SPNs: one group for outbound traffic and one group for inbound traffic because the traffic needs to be sent and received by the same SPN.

To address the symmetric return limitation where traffic needs to be sent and received by the same SPN, in one option, source-based network address translation (SNAT) can be used. When full SNAT is performed, if the traffic is going towards the Internet from a branch, the traffic returns back from the Internet. So if full SNAT is performed for traffic heading towards a destination, the destination knows that the destination needs to return the response back to the same SPN because there is one-to-one association. Full SNAT is performed when traffic goes towards the Internet, but full SNAT is not performed for traffic heading towards private apps and traffic not going towards the Internet (e.g., enterprise bound). Traffic is separated into two types of traffic, one type of traffic is Internet bound and the other type of traffic relates to private apps or is enterprise-bound. SNAT is only performed on the one type of traffic that is Internet bound but SNAT should not be performed on the other type of traffic. However, by using SNAT on the one type of traffic that is Internet bound, certain security functions cannot be performed on the Internet bound traffic. As an example, SNAT is not performed on enterprise-bound traffic because a firewall re-inspects traffic on the destination side or the enterprise side, and performing SNAT can hide sender information. On the other hand, for Internet-bound destination traffic, no re-inspection is performed, so SNAT is acceptable for Internet-bound destination traffic.

Note that some users utilize, for example, a private application (app) Jira to access a data center. Typically, the private application Jira does not need to have a public ID. For example, a machine running Jira can be assigned a private IP address of 10.10.1.1 and get a private ID. When a branch connects to the data center, a branch user uses a data center app to access the data center via the firewall, which performs security and connects the user via the data center app. The data center app transfers traffic back to the requesting client. Since the data center app is used to access the data center, all of the client IP addresses and application IP addresses are private IP addresses.

Since the client IP addresses and the application IP addresses are private IP addresses, for example, the private IP addresses include 10.10.10.1 for the private app Jira, and 10.10.10.2 for an active directory (AD) server, 20.20.20.1 for a first user, and 20.20.20.2 for a second user, which are examples of private IP addresses given to the requester or the client. Identity can be tied to an IP address and security can be directly applied to the user's identity. Identity is not carried on the packet, but identity is associated with the IP address. During runtime, when a packet comes from the private IP address 20.20.20.1, after the first user is logged in, all of the traffic of the first user is associated with the IP address 20.20.20.1, and security is applied based on the identity associated with the IP address 20.20.20.1.

An IP address can be in all of the packets. An identity can be determined only for enterprise apps or non-Internet bound traffic because all traffic is sent via a tunnel and has a private IP address. When accessing the Internet, no user can originate traffic via a private IP address because the traffic cannot be returned from the Internet to the user via the private IP address. Instead, SNAT is used to access the Internet. In other words, if traffic is coming from a branch in which both the first user and the second user are working, a packet of traffic bound for the Internet is associated with a source IP address of the firewall and the identity of the packet is lost because all Internet-bound traffic is assigned the public IP address of the firewall. In other words, different packets from the first and second users have the same public IP address when accessing the Internet.

When accessing the Internet, SNAT can be performed to prevent the exposure of the private IP addresses. On the other hand, when accessing enterprise apps, typically, the firewall or the SPN does not perform full SNAT because customers may want to apply security solutions also on traffic bound for the enterprise apps. For example, because identity is known for enterprise app users, security can be performed on traffic generated by the enterprise app users. As an example, the firewall or the SPN would like to know whether the first user or the second user is accessing the data center or source code server. If SNAT is performed when accessing an enterprise app, by the time a packet arrives at the data center, the firewall or the SPN has lost the identity of the packet, and the firewall cannot apply a second level of security on the packet accessing the data center because the packet is combined with packets from other users, so SNAT can be used for accessing the Internet but not for accessing enterprise apps.

For the traffic landing on the firewall or on the data center, a first level of security is performed by hardware firewalls, and servers perform a second level of intrusion detection. The firewall wants to retain the identity and does not want SNAT performed on the traffic. For both logging and security purposes at the data center, SNAT is not performed for the traffic going towards the data center. Because nobody else is performing security, SNAT can be performed when accessing the cloud.

In some embodiments, branch-2 (B2) is a large branch where the branch sends 10 Gbps of traffic. As an example, branch-1 (B1) is sending 100 Mbps, branch-50 (B50) is sending 100 Mbps, and branch-2 (B2) is sending 10 Gbps, which is a large amount of traffic. As an example, a single SPN cannot process the entire 10 Gbps, the traffic from branch-2 needs to be broken into multiple smaller segments in an intelligent fashion, and traffic sent from a given node needs to return back to the same node. The outbound traffic from a given node cannot return via a different node.

B2 needs to be intelligently distributed using the NPN layer where the NPN layer decrypts the IPSec traffic or secure traffic. With branch-2, multiple tunnels come into the NPN layer, and the traffic is decrypted and distributed by an NPN and distributed to more than one SPN.

As an example, there are 4 SPNs including SPN1, SPN2, SPN3, and SPN4. For example, branches 1-24 are associated with SPN1, and branches 25-50 are associated with SPN2. SPN3 and SPN4 are not associated with any branches. Furthermore, for branch-2, any traffic destined for the Internet can be assigned to any SPN because the SPN is allowed to perform SNAT. Determining traffic going to the Internet can be determined by looking at the routing. If a route advertised by a data center application does not exist, the default route is used to send the packets to the Internet because that traffic needs to go to the cloud server, Office 360 server, etc. If traffic is heading to the default route, the traffic is Internet bound traffic, so Internet traffic can be distributed to any of the SPNs. In this example, Internet traffic goes to SPN1, SPN2, SPN3, and SPN4. A first level of distribution takes the Internet traffic, without performing any intelligence, and load balances the Internet bound to all of the SPNs.

In this example, after performing load distribution for the Internet-bound traffic, the NPNs analyze enterprise-bound traffic. As an example, Branch-2 (Br2) advertises prefix 1 (Br2-P1) 10.10.10.0/24 and prefix 2 (Br2-P2) 20.20.20.0/24 as shown in FIG. 4. Br2 can handle a predetermined number of prefixes (source prefixes). These are the IP addresses that are going to be assigned to machines behind the branch.

For the very large network behind branch-2, the SPNs control the routing for branch-2 and know the set of prefixes that are coming from the branch. Because BGP routing is being performed, routes are learned from branch-2. Since Internet bound traffic arriving from branch-2 can be distributed to any SPN, the NPN layer can distribute the Internet bound traffic evenly between SPN1, SPN2, SPN3, and SPN4. For non-Internet bound traffic arriving from branch-2, a prefix distribution is performed for branch-2. For example, branch-2 advertises two prefixes Br2-P1 and Br2-P2. The NPN layer can distribute traffic arriving from source prefixes Br2-P1 to SPN3 and traffic arriving from source prefix Br2-P2 to SPN4. Each prefix needs to be monitored closely to determine how heavy their traffic is.

For example, behind prefix Br2-P1 could be 100 users and behind prefix Br2-P2 could be just two users. Each prefix is not equal and it can be difficult to determine how light or how heavy a prefix is from appearance. To distribute this traffic, the NPN layer needs to monitor the traffic at run-time. For example, how much traffic is coming from prefixes Br2-P1 and Br2-P2 is determined and the traffic is distributed so a given SPN's capacity is not exceeded.

The load distribution can be monitored based on prefixes. In another example, a customer sends/receives a great deal of traffic for its one prefix. Since there is only one prefix, all of the traffic from the customer is forwarded to one SPN and can overrun the one SPN. Consequentially, the single prefix is to be split into smaller prefixes internally for traffic distribution.

In this scenario, the one prefix can be broken up into two or more portions. For example, the one prefix is broken up into 2 different portions or 10 different portions. In the example, a customer having a single prefix, 10.0.0.0/24 and behind the prefix is up to 256 users. In order for the SPNs to handle the traffic, the prefix is broken into eight non-overlapping portions. For example, P1-1 is represented by 10.0.0.0/27, P1-2 is represented by 10.0.0.32/27, P1-3 is represented by 10.0.0.64/27, etc. The breakdown can be dynamically performed, and if the traffic continues to exceed the capacity of at least one SPN of the SPNs, the traffic can be further broken down and go another level deeper. As an example of another level deeper, p1-1-1 is represented by 10.0.0.2/31. If the prefix has a subnet mask of 255.255.255.255, then each user has a unique IP address, and the prefix can no longer be further split. Also, as more routes are distributed in BGP, a route scaling issue can be created, so prefix splitting should be performed enough times to allow traffic to be distributed evenly without causing a route scale problem.

In some embodiments, the cloud security service starts with /24. If the prefix needs to be further broken down, the prefix /25 can be used. If the prefix needs to be further broken down, the prefix /27 can be used. As an example, the trigger or threshold to perform a split is when one Gbps per tunnel is exceeded by at least one SPN. In the event that the traffic exceeds capacity on at least one SPN, prefix splitting can be performed. After the prefix splitting is performed, if the traffic continues to exceed capacity of at least one SPN, additional SPNs can be added on the backend.

For a request coming from an IP address relating to a first user, the cloud security service knows that if the first user is reachable from both SPN3 and SPN4, the cloud security service is free to choose to return the response to either SPN3 or SPN4. Using a prefix as an example instead of a user's IP address, if a request from a user is reachable both by SPN3 and SPN4 and if an IP address of the user is advertised to the rest of the world as 10.0.0.0/24, the user is reachable by SPN3 and SPN4, and traffic can be sent through any one of SPN3 and SPN4 to the user. As an aspect, if the traffic is coming from SPN3, the first user is reachable both by SPN3 and SPN4, and if the user returns the response back to SPN4, symmetric return cannot be satisfied because client to server traffic went through one router, and server to client traffic went through a different router, so security processing cannot be performed because symmetric return was not satisfied.

In other words, the prefix 10.0.0.0/24 should stay only in one SPN. The prefix cannot go into a second SPN because of the symmetric return issue. When the SPN is advertising its reachability into the rest of the world, the SPN can advertise only from one place unless insourcing or SNAT. As a result, a prefix distribution is performed rather than each SPN advertising all of the routes.

As an example, in splitting the prefix, the subnet mask can be reduced from 24 bits to 27 bits, and then the traffic can be split across multiple SPNs, as well as across all of the SPNs to see whether the traffic is too high on one or more of the SPNs. If the traffic is still too high on one or more of the SPNs, the subnet mask can be further increased to split the traffic amongst the multiple SPNs.

In some embodiments, when prefix splitting is performed, splitting prefix has a cost and implications because the routing scale increases in size because more prefixes exist, and every router has to learn more routes and there are certain limits of the cloud routers. As an aspect, if prefix splitting is required, the more granular the prefixes are split, the more routing scale is created.

The NPN layer of FIG. 3 corresponds with the NPN layer of FIG. 4, and the ELB is not participating in the prefix distribution/splitting decision making. The network fabric 800 works with or without the ELB. The intelligence is in the NPN layer for doing this kind of prefix monitoring, prefix splitting, and prefix distribution.

SaaS apps are apps that include, for example, a Salesforce app, Google apps, Office 365, etc., which run in the public cloud, and enterprise apps run, for example, in a private data center. Traffic going to the SaaS apps are run in the public cloud, and private IP addresses cannot be used to access the SaaS apps.

Figure 5:
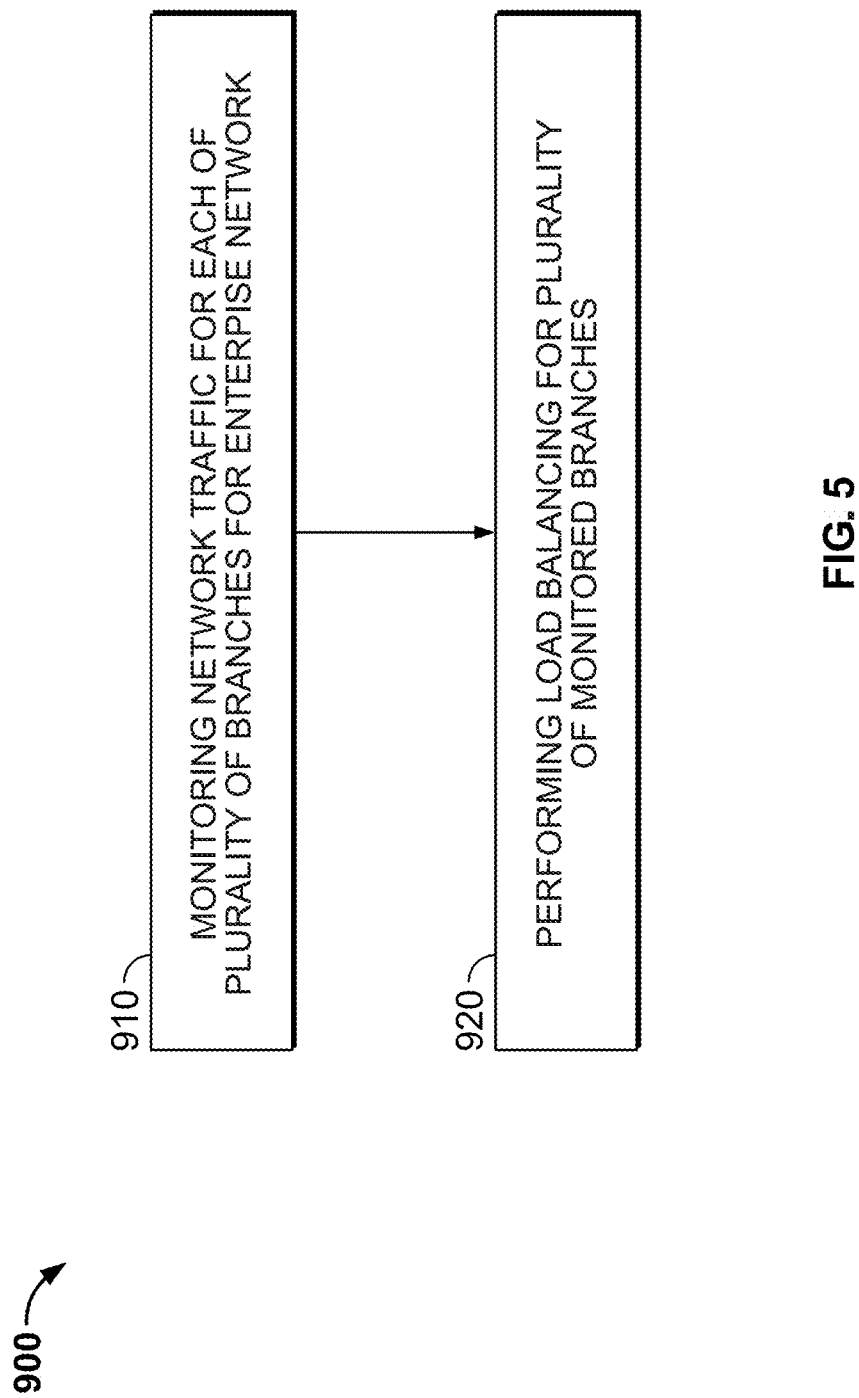
FIG. 5 is a flow diagram illustrating a process for load balancing secure network traffic in accordance with some embodiments.

FIG. 5 is a flow diagram illustrating a process for load balancing secure network traffic in accordance with some embodiments. In some embodiments, process 900 is implemented by the cloud security service 710 of FIG. 3 and includes:

In 910, the cloud security service monitors network traffic for each of a plurality of branches for an enterprise network.

In 920, the cloud security service performs load balancing for the plurality of monitored branches to a plurality of security processing nodes (SPNs) using a network load balancer (NLB) in communication with a plurality of Network Processing Nodes (NPNs). In some embodiments, the plurality of monitored branches are distributed to the plurality of SPNs via a plurality of tunnels.

Figure 6:
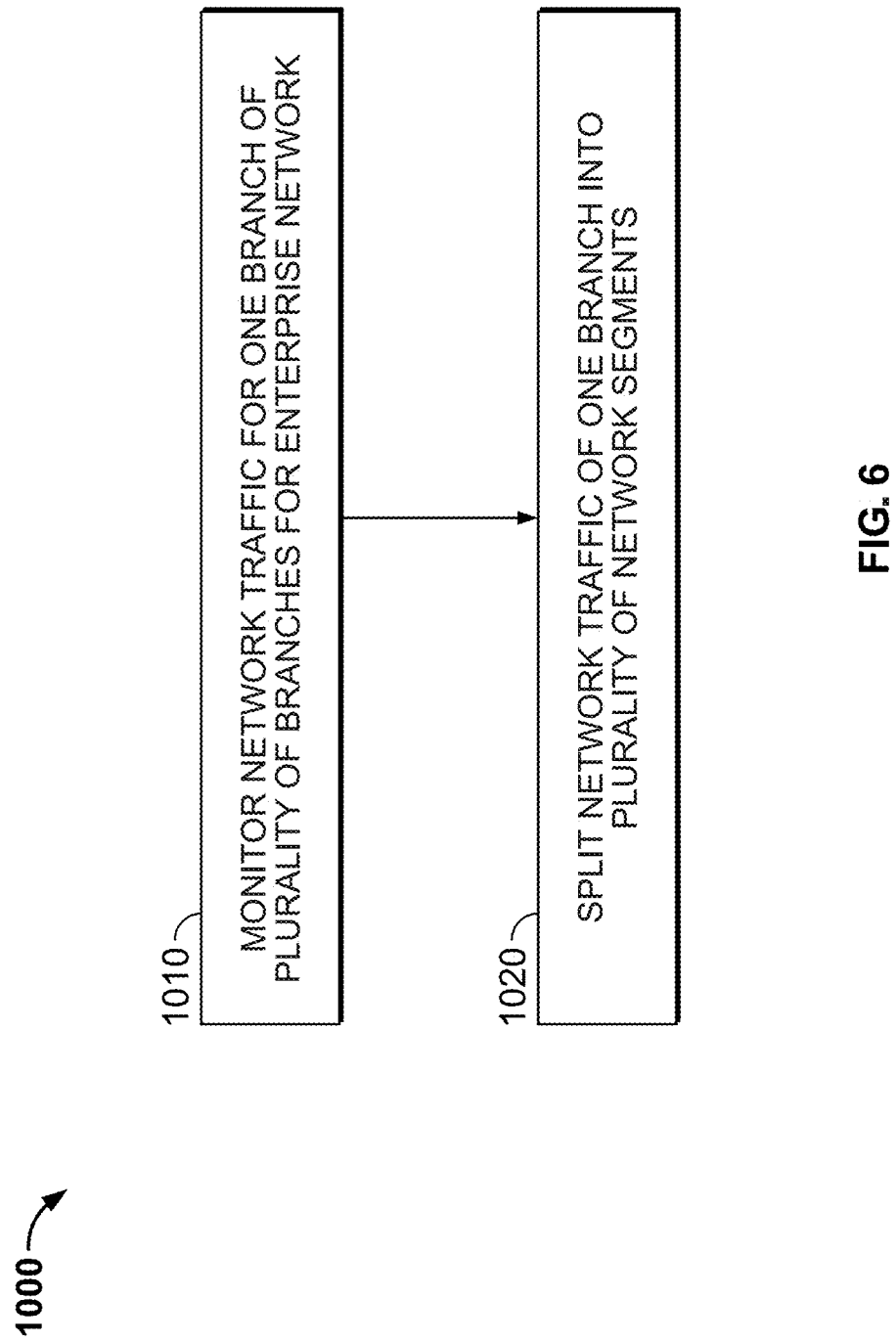
FIG. 6 is a flow diagram illustrating another process for load balancing secure network traffic in accordance with some embodiments.

FIG. 6 is a flow diagram illustrating another process for load balancing secure network traffic in accordance with some embodiments. In some embodiments, process 1000 is implemented by the cloud security service 810 of FIG. 4 and includes:

In 1010, the cloud security service monitors network traffic for one branch of a plurality of branches for an enterprise network.

In 1020, the cloud security service splits the network traffic of the one branch into a plurality of network segments based on a determination that the network traffic exceeds traffic capacity of at least one security processing node (SPN) of a plurality of SPNs using a network load balancer (NLB) in communication with a plurality of Network Processing Nodes (NPNs). In some embodiments, the plurality of monitored branches are distributed to the plurality of SPNs via a plurality of tunnels.

Figure 7:
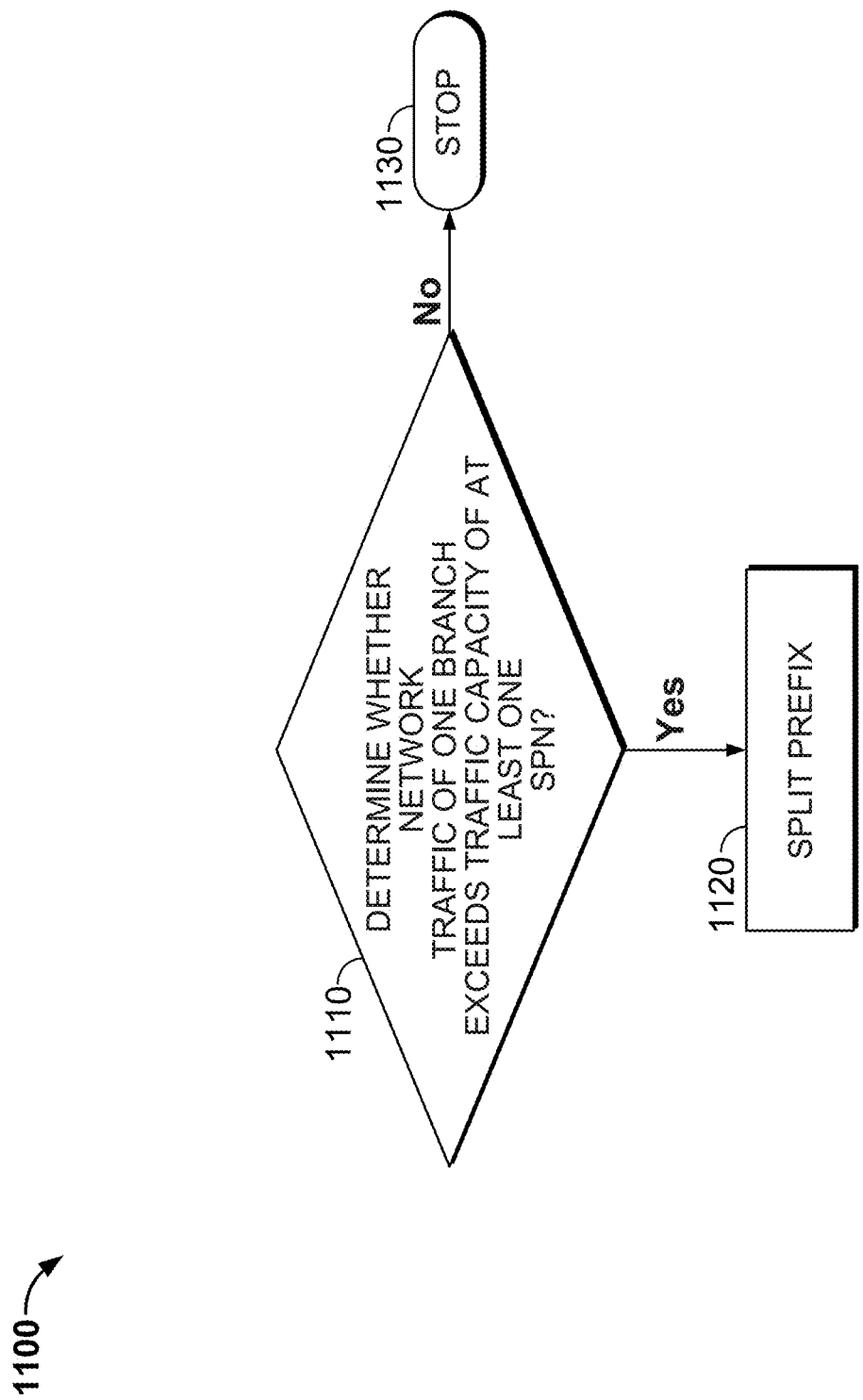
FIG. 7 is a flow diagram illustrating a process for splitting network traffic of one branch into a plurality of network segments in accordance with some embodiments.

FIG. 7 is a flow diagram illustrating a process for splitting network traffic of one branch into a plurality of network segments in accordance with some embodiments. In some embodiments, the process 1100 is an implementation of operation 1020 of FIG. 6 and includes:

In 1110, the cloud security service determines whether network traffic of one branch exceeds traffic capacity of at least one SPN. In some embodiments, the network traffic of the one branch is associated with at least one prefix.

In 1120, in response to a determination that the network traffic of the one branch exceeds the traffic capacity of the at least one SPN, the cloud security service splits a prefix associated with the one branch into a plurality of prefixes.

In 1130, in response to a determination that the network traffic of the one branch fails to exceed the traffic capacity of the at least one SPN, the cloud security service stops the process.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor network traffic for one branch of a plurality of branches for an enterprise network; and
split the network traffic of the one branch into a plurality of network segments based on a determination that the network traffic exceeds traffic capacity of at least one security processing node (SPN) of a plurality of SPNs using a network load balancer (NLB) in communication with a plurality of Network Processing Nodes (NPNs), wherein the one monitored branch is distributed to the plurality of SPNs via a plurality of tunnels, wherein the splitting of the network traffic of the one branch into the plurality of network segments comprises to:
determine that the network traffic of the one branch exceeds the traffic capacity of the at least one SPN, wherein the network traffic of the one branch is associated with at least one prefix; and
in response to the determination that the network traffic of the one branch exceeds the traffic capacity of the at least one SPN, split the at least one prefix into a plurality of smaller prefixes, wherein the at least one prefix is broken into a first non-overlapping portion and a second non-overlapping portion; and
a memory coupled to the processor and configured to provide the processor with instructions.

2. The system of claim 1, wherein the splitting of the at least one prefix into the plurality of prefixes comprises to:
determine whether a subnet mask associated with the at least one prefix is 32 bits; and
in response to a determination that the subnet mask associated with the at least one prefix is 32 bits, omit splitting the at least one prefix.

3. The system of claim 1, wherein a subnet mask associated with the at least one prefix has a smaller number of bits than a subnet mask associated with one smaller prefix of the plurality of smaller prefixes.

4. The system of claim 1, wherein the splitting of the network traffic of the one branch into the plurality of network segments comprises to:
perform source-based network address translation (SNAT) on Internet-bound network traffic.

5. The system of claim 4, wherein the splitting of the network traffic of the one branch into the plurality of network segments comprises to:
omit performing the SNAT on traffic heading towards private apps or enterprise-bound traffic.

6. The system of claim 1, wherein each smaller prefix of the plurality of smaller prefixes is associated with a network segment.

7. A method, comprising:
monitoring, using a processor, network traffic for one branch of a plurality of branches for an enterprise network; and
splitting, using the processor, the network traffic of the one branch into a plurality of network segments based on a determination that the network traffic exceeds traffic capacity of at least one security processing node (SPN) of a plurality of SPNs using a network load balancer (NLB) in communication with a plurality of Network Processing Nodes (NPNs), wherein the one monitored branch is distributed to the plurality of SPNs via a plurality of tunnels, wherein the splitting of the network traffic of the one branch into the plurality of network segments comprises:
determining that the network traffic of the one branch exceeds the traffic capacity of the at least one SPN, wherein the network traffic of the one branch is associated with at least one prefix; and
in response to the determination that the network traffic of the one branch exceeds the traffic capacity of the at least one SPN, splitting the at least one prefix into a plurality of smaller prefixes, wherein the at least one prefix is broken into a first non-overlapping portion and a second non-overlapping portion.

8. The method of claim 7, wherein the splitting of the at least one prefix into the plurality of prefixes comprises:
determining whether a subnet mask associated with the at least one prefix is 32 bits; and
in response to a determination that the subnet mask associated with the at least one prefix is 32 bits, omitting to split the at least one prefix.

9. The method of claim 7, wherein a subnet mask associated with the at least one prefix has a smaller number of bits than a subnet mask associated with one smaller prefix of the plurality of smaller prefixes.

10. The method of claim 7, wherein the splitting of the network traffic of the one branch into the plurality of network segments comprises:
performing source-based network address translation (SNAT) on Internet-bound network traffic.

11. The method of claim 10, wherein the splitting of the network traffic of the one branch into the plurality of network segments comprises:
omitting to perform the SNAT on traffic heading towards private apps or enterprise-bound traffic.

12. The method of claim 7, wherein each smaller prefix of the plurality of smaller prefixes is associated with a network segment.

13. A computer program product embodied in a non-transitory computer readable medium and comprising computer instructions for:
- monitoring network traffic for one branch of a plurality of branches for an enterprise network; and
- splitting the network traffic of the one branch into a plurality of network segments based on a determination that the network traffic exceeds traffic capacity of at least one security processing node (SPN) of a plurality of SPNs using a network load balancer (NLB) in communication with a plurality of Network Processing Nodes (NPNs), wherein the one monitored branch is distributed to the plurality of SPNs via a plurality of tunnels, wherein the splitting of the network traffic of the one branch into the plurality of network segments comprises:
    - determining that the network traffic of the one branch exceeds the traffic capacity of the at least one SPN, wherein the network traffic of the one branch is associated with at least one prefix; and
    - in response to the determination that the network traffic of the one branch exceeds the traffic capacity of the at least one SPN, splitting the at least one prefix into a plurality of smaller prefixes, wherein the at least one prefix is broken into a first non-overlapping portion and a second non-overlapping portion.

* * * * *